United States Patent
White

(10) Patent No.: US 7,244,944 B2
(45) Date of Patent: Jul. 17, 2007

(54) TRIGGERING SYSTEM AND METHOD

(75) Inventor: Jay Paul White, Bohemia, NY (US)

(73) Assignee: Symbol Technologies, Inc, Holtsville, NY (US)

( * ) Notice: Subject to any disclaimer, the term of this patent is extended or adjusted under 35 U.S.C. 154(b) by 37 days.

(21) Appl. No.: 11/170,312

(22) Filed: Jun. 28, 2005

(65) Prior Publication Data

US 2006/0289771 A1    Dec. 28, 2006

(51) Int. Cl.
*H04B 10/10* (2006.01)
*G08C 23/04* (2006.01)

(52) U.S. Cl. .................. 250/370.1; 398/106; 398/109; 398/111; 398/112

(58) Field of Classification Search ............. 250/370.1; 235/472.01, 462.45, 462.48; 398/112, 111, 398/109, 106
See application file for complete search history.

(56) References Cited

U.S. PATENT DOCUMENTS

| 4,905,001 A | | 2/1990 | Penner et al. | |
|---|---|---|---|---|
| 5,481,265 A | * | 1/1996 | Russell | 341/22 |
| 5,555,120 A | * | 9/1996 | Telymonde et al. | 398/111 |
| 5,907,147 A | | 5/1999 | La et al. | |
| 6,357,662 B1 | * | 3/2002 | Helton et al. | 235/462.45 |
| 6,375,079 B1 | * | 4/2002 | Swartz | 235/472.01 |
| 6,427,917 B2 | * | 8/2002 | Knowles et al. | 235/462.44 |
| 6,473,023 B1 | * | 10/2002 | Takagi et al. | 341/176 |
| 6,634,556 B2 | * | 10/2003 | Courtney et al. | 235/462.36 |
| 6,648,229 B1 | * | 11/2003 | Knowles et al. | 235/462.44 |
| 6,655,597 B1 | * | 12/2003 | Swartz et al. | 235/462.45 |
| 6,672,513 B2 | * | 1/2004 | Bard et al. | 235/472.01 |
| 6,778,380 B2 | * | 8/2004 | Murray, Jr. | 361/679 |
| 6,811,088 B2 | * | 11/2004 | Lanzaro et al. | 235/462.46 |
| 6,817,529 B2 | * | 11/2004 | Barkan et al. | 235/472.01 |
| 6,853,293 B2 | * | 2/2005 | Swartz et al. | 340/5.92 |
| 2003/0206393 A1 | | 11/2003 | Murray et al. | |
| 2004/0071471 A1 | * | 4/2004 | Baker et al. | 398/140 |
| 2004/0222301 A1 | | 11/2004 | Willins et al. | |

* cited by examiner

*Primary Examiner*—Constantine Hannaher
(74) *Attorney, Agent, or Firm*—Fay Kaplun & Marcin, LLP

(57) ABSTRACT

Described is a triggering arrangement including a power supply, a lighting arrangement and a switch. The lighting arrangement is coupled to the power supply. The switch is coupled to the lighting arrangement and the power supply. When the switch is in a first position, the lighting arrangement generates light to a photo-sensing portable device. The device is situated a predetermined distance from the arrangement. The device initiates a predetermined action in response to the light.

15 Claims, 4 Drawing Sheets

TRIGGERING SYSTEM AND METHOD

BACKGROUND

Optical scanning systems, such as those used in warehouses and supermarkets to track inventory, are in widespread use. Wearable and handheld scanning systems have increased mobility and productivity, but have generally sacrificed durability.

A conventional wearable scanning system includes a trigger connected to a wearable scanner via a wire. The wire hangs loosely between the scanner and the trigger, and is thus prone to mechanical failure during use, shipping, etc. Another disadvantage associated with the conventional wearable scanning systems includes accidental triggering by inadvertent contact with an exposed switch. The wearable scanning systems have been manufactured without triggering components, providing an auto-triggering mechanism. However, this also has disadvantages, such as power inefficiency and inadvertent repetitive scanning of the same barcode.

SUMMARY OF THE INVENTION

The present invention relates to a triggering arrangement including a power supply, a lighting arrangement and a switch. The lighting arrangement is coupled to the power supply. The switch is coupled to the lighting arrangement and the power supply. When the switch is in a first position, the lighting arrangement generates light to a photo-sensing portable device. The device is situated a predetermined distance from the arrangement. The device initiates a predetermined action in response to the light.

DETAILED DESCRIPTION

Figure 1A:
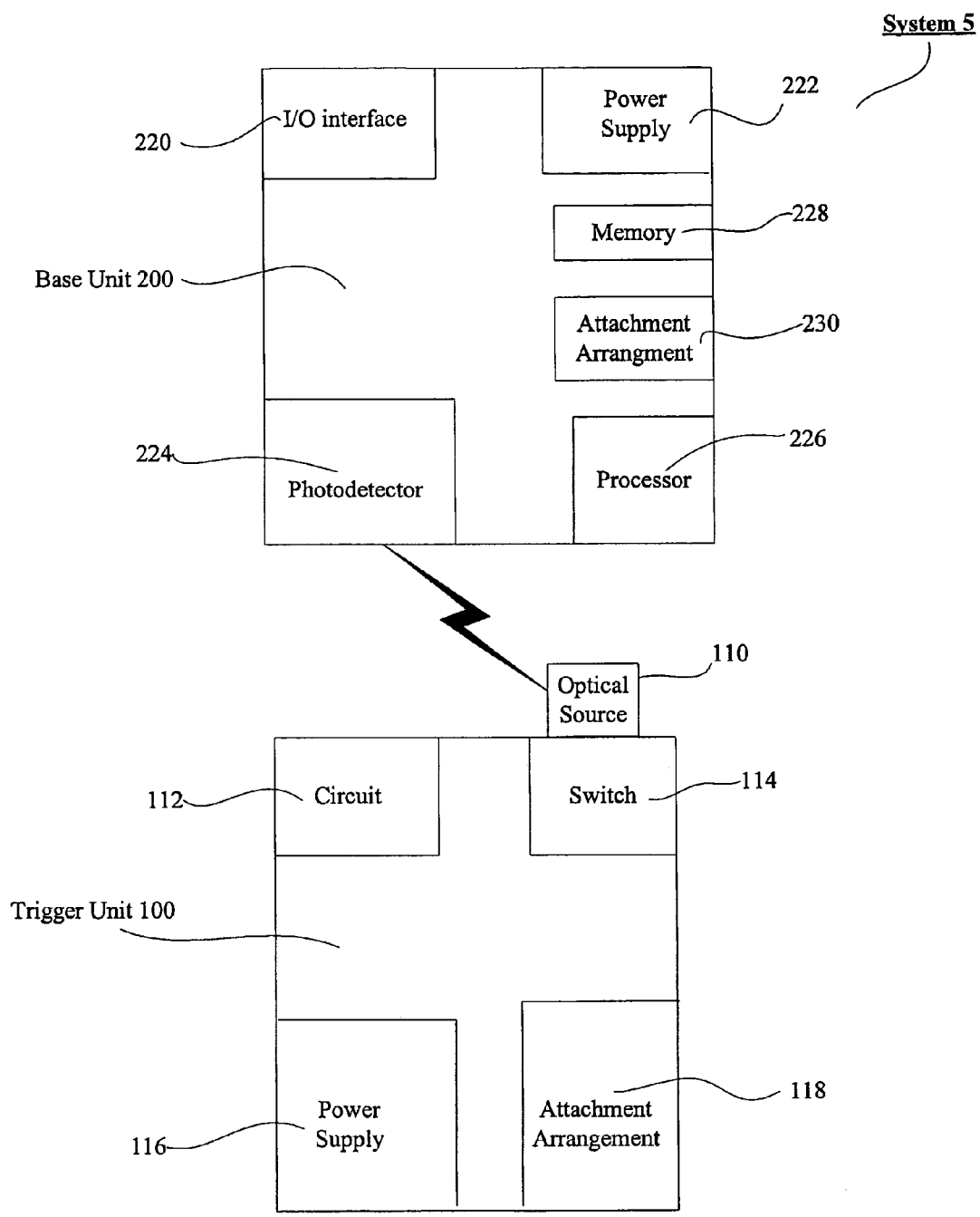
FIG. 1a shows an exemplary embodiment of a system according to the present invention.

The present invention may be further understood with reference to the following description and the appended drawings, wherein like elements are referred to with the same reference numerals. An exemplary embodiment of the present invention describes a system including a base unit which executes a predetermined action in response to a signal from a trigger unit (e.g., triggering arrangement). In the exemplary embodiment, the base unit may perform optical scanning, and the trigger unit wirelessly communicates with the base unit.

Figure 1B:
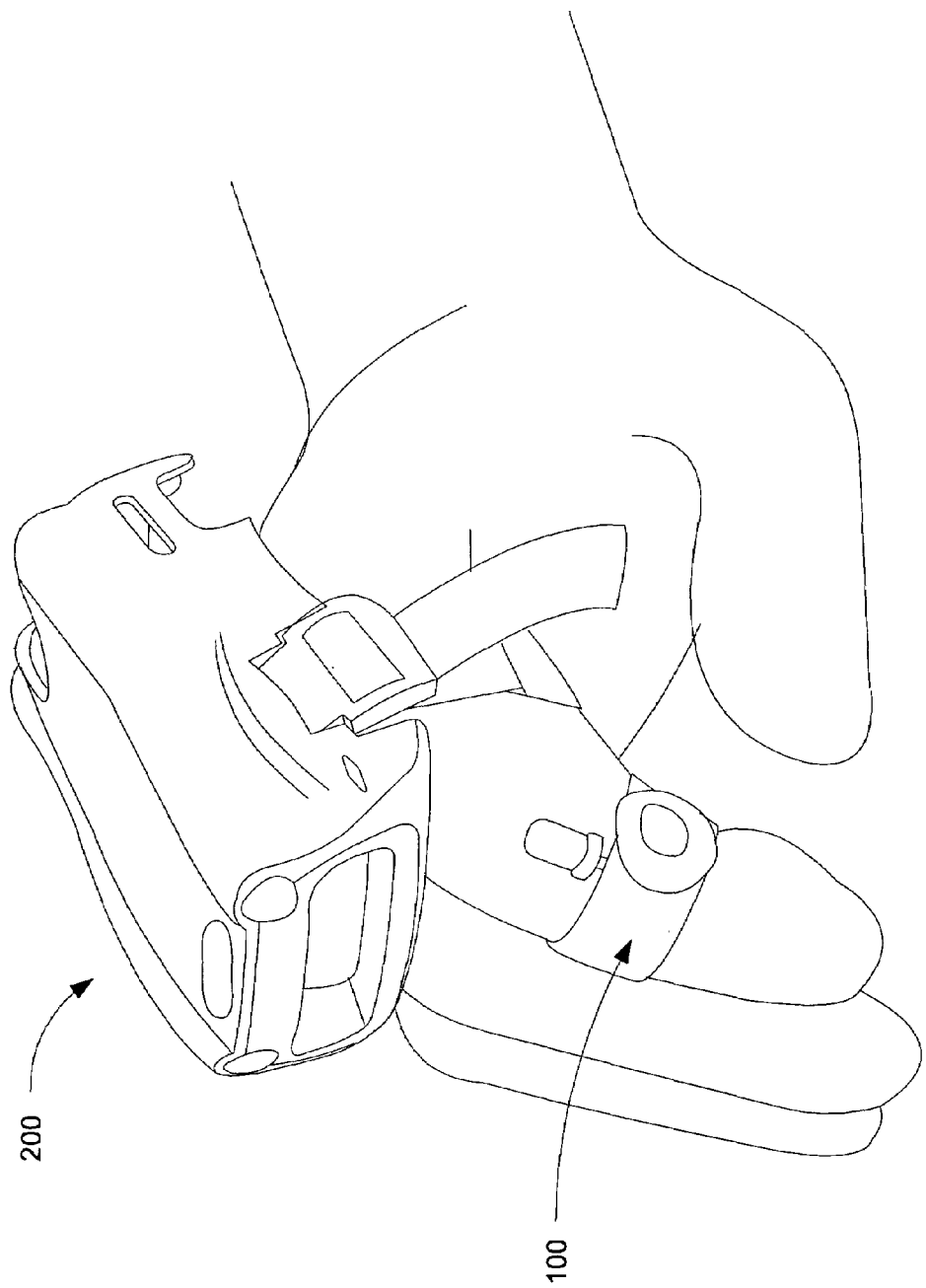
FIG. 1b shows the embodiment of the present invention shown in FIG. 1.

FIGS. 1a and 1b show an exemplary embodiment of a system 5 according to the present invention. The system 5 includes a trigger unit 100 which activates a base unit 200. In one embodiment, the trigger unit 100 is separate from the base unit 200, without a wired connection therebetween. Further, in this embodiment, a user of the system 5 may wear and/or hold both the trigger unit 100 and the base unit 200 which will be described further below. Because the units 100 and 200 are not coupled via the wired connection, the user may position the units 100 and 200 according to desired levels of comfort, operative convenience, etc.

The trigger unit 100 may include a lighting arrangement (e.g., an optical source 110), a power supply 116, and a first attachment arrangement 118. In another exemplary embodiment, the trigger unit 100 further includes a circuit 112. These components may be placed proximal to each other and attached separately to the attachment arrangement 118, or, alternatively, each component may be partially or entirely encased within a housing which is attached to the attachment arrangement 118. That is, as will be described below, it may be preferable to enclose all of the components of the trigger unit 100 entirely within the housing, except the switch 114 which may be only partially enclosed, leaving a portion thereof exposed to an external environment. As understood by those skilled in the art, the housing may be manufactured from any material (e.g., plastic, rubber, etc.) and may be of any size and shape. Preferably, the housing is manufactured as small as possible while protecting the components thereinside.

In one embodiment, the optical source 110 is a conventional light emitting diode ("LED"), such as an infrared LED used in a television remote control or an infrared port of a computing device (e.g., a personal computer, a laptop, a cell phone, etc). However, as understood by those of skill in the art, the optical source 110 may be any device which generates light and is capable of being switched between a first state (e.g., an "off state") and a second state (e.g., an "on state"). Furthermore, when in the second state, an output of the optical source 110 is preferably of an intensity sufficient to be detected by the base unit 200, which will be described further below. Although one embodiment of the optical source 110 includes the LED, other embodiments may utilize an optical source which emits a light in a visible portion of an electromagnetic spectrum. As understood by those of skill in the art, the light may have various wavelengths and frequencies.

The power supply 116 may be a conventional battery which provides power to the optical source 110. The battery may be, for example, a button cell battery such as those used in wrist watches. The trigger unit 100 is preferably a low-power mechanism consuming less than a few milliwatts when activated, thereby maximizing a life of the power supply 116. Thus, when the power supply 116 is exhausted (e.g., the battery has been completely discharged), the entire trigger unit 100 may be discarded. In other embodiments, the power supply 116 may be replaceable or rechargeable.

The switch 114 allows the user to initiate a transmission of a first signal (e.g., a single signal, a plurality of signals in a predefined pattern) from the optical source 110. The first signal is used to activate the base unit 200, as will be described below. The switch 114 may be any type of switching mechanism such as, for example, a toggle, a pushbutton, a rocker, or a slide switch. In one embodiment, the switch 114 is a momentary pushbutton which remains in a first position (e.g., an open position) when not activated. In another embodiment, the switch may be in a second position (e.g., a closed position) which may result in continuous energizing of the optical source 110 until the switch 114 is switched to the first position by the user. The switch 114 may be constructed of a plastic or a rubber, and may be of varying flexibility and hardness. The switch 114 may also be of various sizes. For example, the switch 114 may be constructed of a silicone rubber with a durometer rating between 30 and 60, and a snap ratio between 40-60%. In one embodiment, the switch 114, as the pushbutton, may be about 2 cm above a surface it is attached to when in the default position.

The first attachment arrangement 118 secures the trigger unit 100 to the user. In one embodiment, the first attachment arrangement 118 is fitted over a middle phalange of an index finger of the user and positioned on a medial side thereof so that the switch 114 can be activated by the user's thumb. The first attachment arrangement 118 may be a band (e.g., elastic, Velcro®, etc.) that adjusts to the user's finger. In another embodiment, the band may be laced through a securing mechanism (e.g., a buckle, a loop, etc.) attached to the housing or an end of the band itself. The first attachment arrangement 118 may not exceed half an inch in width and one eighth inch in thickness. In yet another embodiment, the first attachment arrangement 118 may be constructed as a one-size or a sizable ring which fits over one or more fingers, or the hand of the user.

In operation, the user may initiate the transmission of the first signal by placing the switch 114 in the second position (e.g., depressing the pushbutton) and releasing the switch 114 allowing it to return to the first position. Thus, the first signal may be transmitted once for each time the switch 114 is in the second position. In another embodiment, the switch 114 may be placed in the second position for a fixed amount of time before switching to the first position. Thus, the first signal may be repeatedly transmitted for as long as the switch is in the second position. Alternatively, the switch 114 may remain in the second position until it is switched into the first position. In this embodiment, the base unit 200 may be continually activated until the switch is placed in the first position.

In another exemplary embodiment, the trigger unit 100 further includes the circuit 112, which is connected to the switch 114, the optical source 110 and the power supply 116. When the switch 114 is in the second position, the circuit 112 causes the optical source 110 to transmit the first signal. In this embodiment, the first signal uniquely identifies the trigger unit 100 in order to prevent false triggering of the base unit 200 by, for example, other trigger units within a detection range of the base unit 200. Thus, the first signal may be one or more signals arranged in a predefined pattern (e.g., one or more light pulses, each having a predetermined duration). The pattern may be encoded or programmed into the circuit 112 prior to or during use of the trigger 100. In addition, the pattern may be distinct from that of commonly used infrared devices (e.g., infrared codes used in universal remote controls) and other trigger units in order to minimize interference with communication between the trigger unit 100 and the base unit 200. Those skilled in the art will understand that the circuit 112 may include analog and/or digital components. The circuit 112 may, for example, include a timing device such as a quartz crystal or a resistor-capacitor ("RC") circuit. In another embodiment, the trigger unit 100 may not include the circuit 112, and the first signal may be a continuous signal without the pattern. Thus, the base unit 200 may be activated by detection of the first signal itself rather than the pattern.

In the exemplary embodiment of the system 5, the base unit 200 may be a portable photo-sensing device which is activated by the trigger unit 100. The base unit 200 may include an input/output ("I/O") interface 220, a power supply 222, an optical sensor (e.g., a photodetector 224), a processor 226, a memory 228, and a second attachment arrangement 230. In use, the base unit 200 is positioned so that the photodetector 224 is in a line-of-sight with the optical source 110 of the trigger unit 100. Exemplary positions for the base unit 200 include a back of a hand or a back of the finger of the user. Thus, the base unit 200 and the trigger unit 100 may generally be located on the same hand, and in particular, the same finger of the user. Further, the components of the base unit 200 may be enclosed, partially or entirely within a further housing. The further housing may have any size and shape and may be manufactured similarly to the housing of the trigger unit 100.

The I/O interface 220 may communicate with a recording device (e.g., a hard drive of a computer, a memory card, etc.) via an attachment port (e.g., universal serial bus, serial, parallel, etc.) to which the recording device is connected. Alternatively or additionally, the I/O interface 220 may include a transceiver for wireless communication with the recording device. That is, the base unit 200 may communicate with the recording device using, for example, radio frequency signals, infrared, etc. The I/O interface 220 may also include additional elements allowing for interaction with the user. In this manner, the base unit 200 may include a keypad, a liquid crystal display ("LCD"), an LED(s), and/or a speaker.

The power supply 222 provides power to the components of the base unit 200. The base unit 200 may consume more power than the trigger unit 100, and therefore may require a larger power source. The power supply 222 may be a conventional battery, which may be rechargeable or replaceable. The battery may vary depending on a size of the base unit 200 and frequency of use. Suitable battery types may include, for example, lithium ion batteries and standard AA or AAA-sized alkaline batteries.

The photodetector 224 may be utilized by the base unit 200 for a plurality of purposes, for example, to obtain data from a barcode. In one embodiment, when the user initiates a scan of the barcode (e.g., activates the base unit 200), the base unit 200 is generally held near the barcode which is illuminated by a light source located within the photodetector 224. The light source may be, for example, a class 1 or 2 laser with an adjustable output. A light ray reflected from the barcode may then be detected by the photodetector 224. The light ray is converted into an electrical signal and transmitted to the processor 226. In another embodiment, the base unit 200 utilizes an imager to generate one or more images of the barcode. The processor 226 decodes the image(s) to extract data contained therein.

According to the present invention, along with performed a plurality of functions (e.g., scanning barcodes), the photodetector 224 may receive the first signal transmitted by the optical source 110 of the trigger unit 100 and translate the first signal into a corresponding electrical signal. In one embodiment, the photodetector 224 may include an amplifying circuit, a filtering circuit, and an analog-to-digital circuit. After the first signal is received and converted into the electrical signal, it may be transmitted by the photodetector 224 to the processor 226 for analysis, as will be described below. Although the exemplary embodiment utilizes the photodetector 224 to scan barcodes and detect the first signal transmitted by the optical source 110, in other embodiments the detections may be performed by one or more separate photodetectors, which may be constructed so as to be particularly sensitive to transmissions of varying characteristics (e.g., frequency, wavelength, intensity, etc.). That is, the photodetector 224 may be used, for example, to scan barcodes while a further photodetector within the same base unit 200 may be used to receive the first signal.

The memory 228 may store a second signal which corresponds to the first signal of the trigger unit 100. That is, the second signal is a version of the first signal which has been received by the photodetector 224. As understood by those skilled in the art, the memory 228 may include a plurality of second signals corresponding to a plurality of first signals if, for example, the base unit 200 may be activated by more than one trigger unit. The memory 228 can be any storage device capable of being written to and read from, such as, for example, a dynamic random access memory ("DRAM") or a static random access memory ("SRAM"). In addition, the memory 228 may include a nonvolatile random access memory ("NVRAM") in conjunction with an erasable programmable read-only memory ("EPROM") backup system. The second signal may be written into the memory 228 at a time of manufacture of the base unit 200, or programmed into the memory 228 at a later time, which will be described below.

The processor 226 may control operation of the components of the base unit 200, and in particular, control power supplied to the photodetector 224 switching it between a first mode (e.g., idle) and a second mode (e.g., an active mode during at least one function, e.g., scanning, is performed). As understood by those skilled in the art, the processor 226 may be an application specific integrated circuit ("ASIC") or a microprocessor-based circuit. When the photodetector 224 receives the first signal, the processor 226 compares the first signal with the second signal(s) stored in the memory 228. If the first signal matches with the second signal, the processor 226 switches the photodetector to the second mode. The photodetector 224 may remain in the second mode until the processor 226 returns the photodetector 224 to the first mode. Those skilled in the art will realize that there are many ways in which the processor 226 may switch the photodetector 224 between the first and second modes. For example, the processor 226 may selectively disable and reenable the laser to prevent the barcode from being illuminated, and thus read by the photodetector 224. In other embodiments, the processor 226 may not control the photodetector 224 at all, and leave the photodetector 224 in the second mode, while controlling the transmission between the I/O interface 220 and the recording device by switching the I/O interface 220 between idle and transmit modes.

The second attachment arrangement 230 of the base unit 200 may be similar to the first attachment arrangement 118 of the trigger unit 100. For example, the second attachment arrangement 230 may be constructed from an elastic or a Velcro® band, and may be used in conjunction with a securing device such as a buckle to secure the base unit 200 to the user's body (e.g., the hand or the finger). The second attachment arrangement 230 may vary in length, width, or other dimensions and characteristics depending on the location of the base unit 200 on the user's body. For example, positioning on the back of the hand may require a substantially different second attachment arrangement 230 than positioning on the finger(s). In yet another embodiment, the second attachment arrangement 230 may be constructed as a one-size or a sizable ring which fits over one or more fingers, or the hand of the user.

Figure 2:
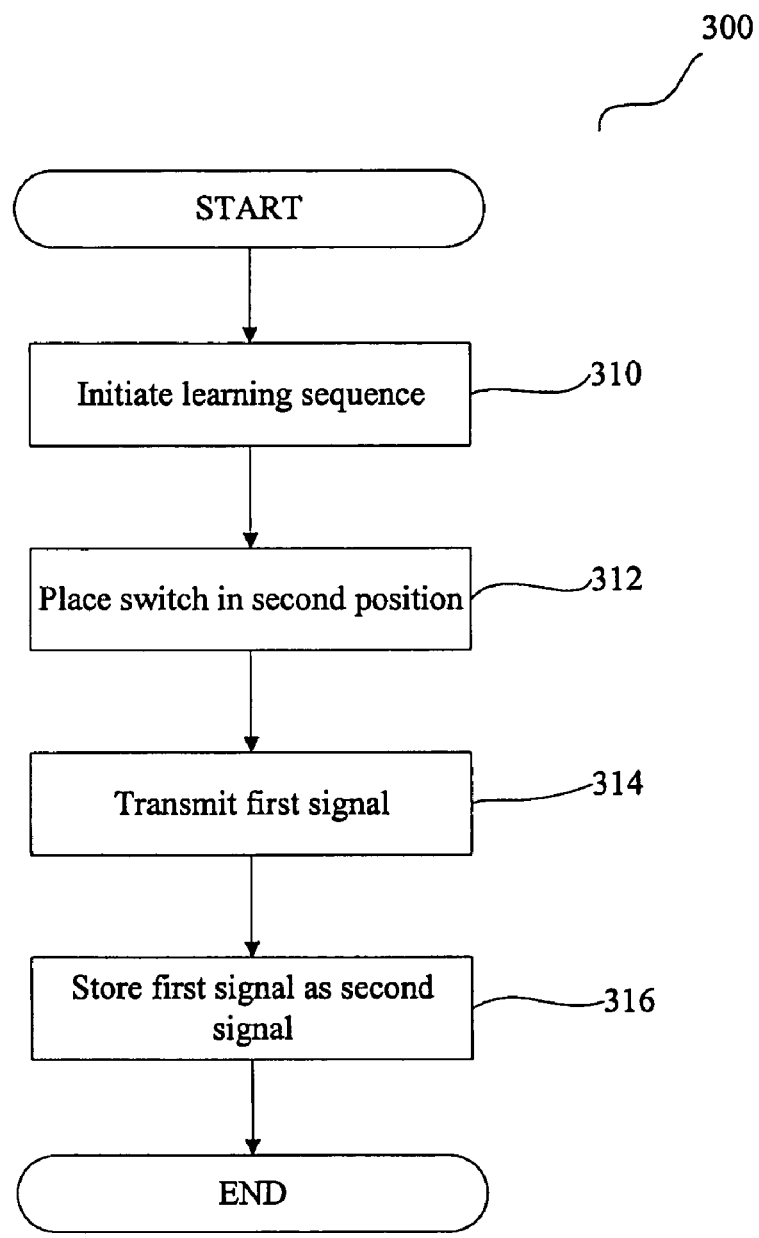
FIG. 2 shows an exemplary embodiment of a method for associating a trigger unit and a base unit according to the present invention.

FIG. 2 shows an exemplary embodiment of a method 300 by which the trigger unit 100 may be associated with the base unit 200. In the exemplary embodiment, the first signal may be programmed into the memory 228 as the second signal during a learning sequence of the base unit 200. In one embodiment, the learning sequence may be initiated each time the base unit 200 is turned on, or be manually initiated by the user if, for example, the trigger unit 100 breaks and a further trigger unit must be associated with the base unit 200. In another embodiment, upon powering on the base unit 200, a timer will start. If the timer reaches a predetermined value (e.g., zero) before receiving a signal from a trigger unit 100, the base-unit 200 may default to an auto-triggering mode (e.g., a "blink mode"). In auto-triggering mode, the base unit 200 may continually look for barcodes, and is used with or without a trigger unit, depending upon an application.

In one embodiment, the base unit 200 may provide an indication to the user that the second signal is not stored. The indication may be visual (e.g., through the LCD or LED) or audible (e.g., through the speaker). Another possibility is to use the laser of the base unit 200. For example, a predetermined sequence of pulses of the laser or preventing operation thereof, may provide the indication that the second signal is not stored in the memory 228.

In step 310, the learning sequence is initiated. As stated above, the learning sequence may be initiated by the user or automatically upon predetermined conditions (e.g., power on, time intervals, etc.). In one embodiment, when powered, the base unit 200 may prepare to receive the first signal and may, optionally, prompt the user to input the first signal. In a further embodiment, the base unit 200 may indicate if one or more second signals are already stored in the memory 228. As stated above, the user may manually initiate the learning sequence at any time, thus allowing the second signal to be stored in the memory 228 during use of the base unit 200. In another embodiment, the timer starts upon power-on, and if the base unit 200 does not receive the first signal from any trigger unit, the base unit 200 may default to, for example, the auto-triggering mode.

In step 312, the user activates the trigger unit 100 by placing the switch 114 in the second position causing the power supply 116 to energize the optical source 110. In the method 300, the user may not be attempting a scan, but may simply be attempting to associate the trigger unit 100 with the base unit 200. Thus, the switch 114 need only be in the second position for a duration which will cause the optical source 110 to transmit the first signal.

In step 314, the trigger unit 100 transmits the first signal in accordance with the circuit 112. As previously discussed, the first signal may include the pattern and/or may have a predefined duration. For example, in one embodiment, the optical source 110 may emit a plurality of pulses of light in the pattern. In another embodiment, the optical source 110 may emit a single pulse of the light for the predefined duration (e.g., 1 second). Preferably, each trigger unit 100 within an operating area (e.g., a section of a warehouse) has a unique pattern and/or duration to minimize interference with further trigger and base units.

In step 316, the first signal is received by the base unit 200 and stored in the memory 228 as the second signal. In one embodiment, the processor 226 may wait for a predetermined amount of time so that the first signal is transmitted at least twice, in order to ensure that the first signal was received correctly. After storing the second signal, the base unit 200 may then alert the user that it is ready for use (e.g., via the LCD, the LED, or the speaker). In another embodiment, the user may initiate a test-mode following the recording of the second signal. For example, the user may activate the trigger unit 100 (e.g., place the switch 114 in the second position) and attempt to scan a barcode. If the test-mode is successful, the base unit 200 may indicate this via the LCD, the LED, or the speaker. However, if the test-mode fails, the base unit 200 may prompt the user to retransmit the first signal. Once the second signal is stored in the memory 228, the base unit 200 may be activated by the trigger unit 100.

Figure 3:
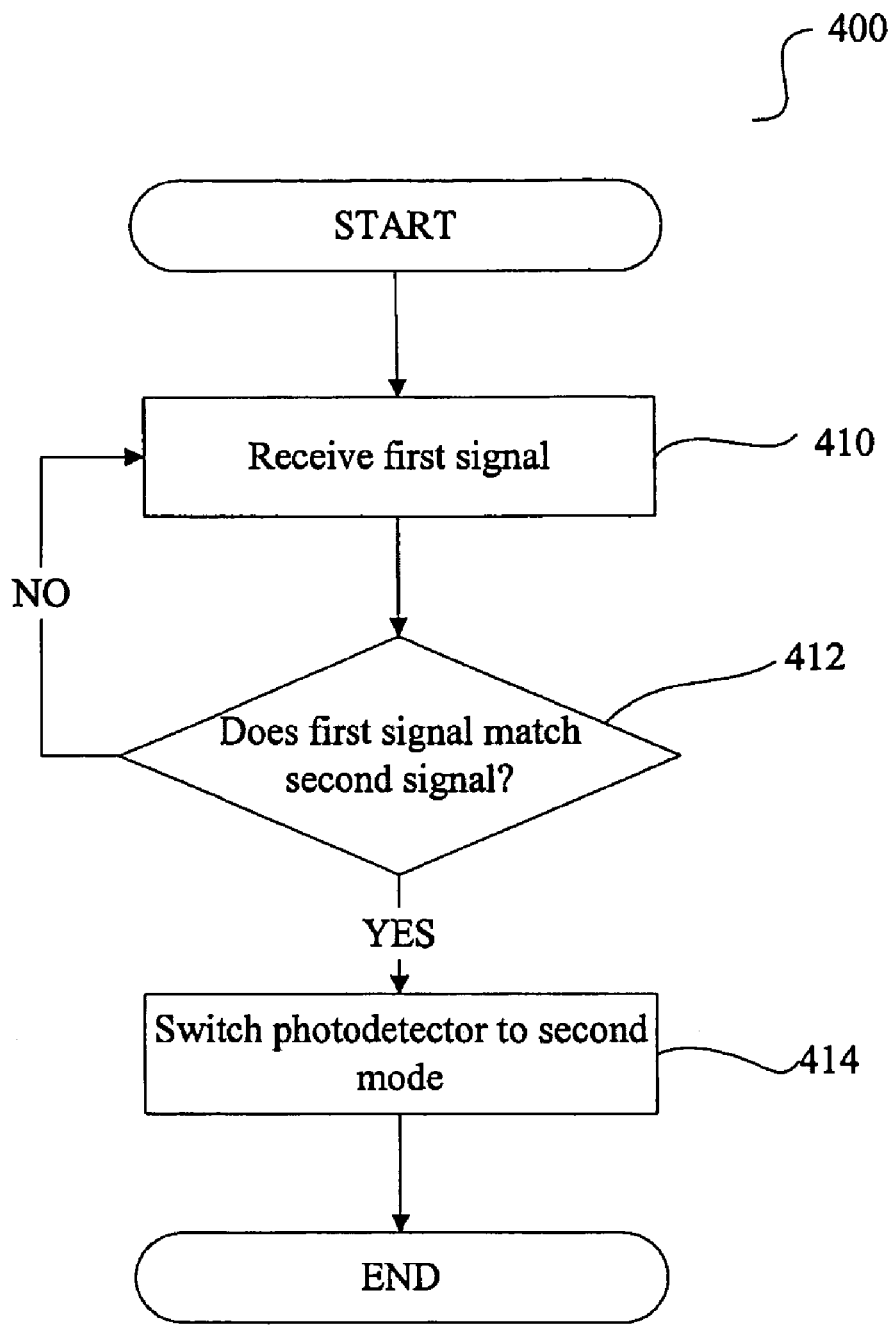
FIG. 3 shows an exemplary embodiment of a method for activating the base unit according to the present invention.

FIG. 3 shows an exemplary embodiment of a method 400 for activating the base unit 200 according to the present invention. In step 410, the photodetector 224 receives the first signal. As stated above, the base unit 200 may include a further photodetector which only responds to the first signal. The method 400 may be implemented by any photodetector which may receive and respond to the first signal, whether it be the photodetector 224 or the further photodetector.

In step 412, the base unit 200 determines whether the first signal matches with the second signal stored in the memory 228. If the comparison fails, the base unit 200 waits for a match, and/or the user may be alerted to the failure. Thus, the photodetector 224 remains in the first mode.

In step 414, the photodetector 224 is switched to the second mode (e.g., begins scanning) because the first signal matches the second signal. For example, the user may complete the scan by placing an item to be scanned beneath the laser of the photodetector 224. The photodetector 224 detects the reflected light rays from the item and transmits the scanned item to the recording device. The user may then be alerted once the transmission is received by the recording device via the LCD, the LED, or the speaker of the base unit 200.

In one exemplary embodiment, the photodetector 224 returns to the first mode after a predetermined time or a user-selected time. For example, the predetermined time may have a first duration long enough for one or more scans. Whereas, the user-selected time may be a function of a second duration for which the user maintains the switch 114 in the second position.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A triggering arrangement, comprising:
   a power supply;
   a lighting arrangement coupled to the power supply; and
   a switch coupled to the lighting arrangement and the power supply,
   wherein when the switch is in a first position, the lighting arrangement generates light to a photo-sensing portable device, the device initiating a predetermined action in response to the light, wherein the light is a continuous signal without a varying pattern.

2. The arrangement according to claim 1, wherein the power supply is a battery.

3. The arrangement according to claim 1, wherein the lighting arrangement is a light-emitting diode.

4. The arrangement according to claim 1, wherein the switch is one of a button, a rocker, a toggle and a slide switch.

5. The arrangement according to claim 1, further comprising:
   an attachment arrangement allowing the triggering arrangement to be worn by a user.

6. The arrangement according to claim 5, wherein the attachment arrangement is one of a sizable band and a molded ring.

7. The arrangement according to claim 1, wherein the light is an infrared light.

8. The arrangement according to claim 1, further comprising:
   an encoding circuit which, when the switch is in the first position, causes the light to be generated in a predefined pattern to the device.

9. The arrangement according to claim 8, wherein the predefined pattern is unique to the triggering arrangement.

10. The arrangement according to claim 8, wherein the device initiates the predetermined action in response to a plurality of predefined patterns.

11. The arrangement according to claim 1, wherein the device is a scanner.

12. The arrangement according to claim 11, wherein the predetermined action is a scan.

13. The arrangement according to claim 1, wherein the device includes a further attachment arrangement for being worn by the user.

14. A system, comprising:
   a photo-sensing portable device including an optical sensor; and
   a triggering arrangement including an optical source wirelessly communicating with the optical sensor, the triggering arrangement including a power supply, an attachment arrangement for attaching the triggering arrangement to a user with the optical source in a line-of-sight of the optical sensor, and a switch which, when activated, supplies energy from the power supply to activate the optical source, an operation of the device being controlled based on signals corresponding to light received by the optical sensor from the optical source, wherein the light is a continuous signal without a varying pattern.

15. The system according to claim 14, wherein the device is a scanner and the operation of the device includes a scanning operation.

* * * * *